US006982955B1

United States Patent
Marshall et al.

(10) Patent No.: US 6,982,955 B1
(45) Date of Patent: Jan. 3, 2006

(54) COMMUNICATIONS NETWORK

(75) Inventors: Ian W Marshall, Woodbridge (GB); Christopher M Roadknight, Grundisburgh (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/537,229

(22) Filed: Mar. 28, 2000

(51) Int. Cl.
H04J 3/14 (2006.01)
(52) U.S. Cl. ............... 370/230; 370/235; 370/254; 370/270; 370/400; 370/465; 370/468; 709/206; 709/228; 709/245; 709/249
(58) Field of Classification Search ............ 370/229, 370/230.1, 236, 252, 384, 254, 432, 440, 370/230–235, 352, 355, 270–400, 465–468; 709/220, 221, 245–249, 206–228
See application file for complete search history.

(56) References Cited

U.S. PATENT DOCUMENTS 5,963,447 A * 10/1999 Kohn et al. ............... 700/49
6,226,273 B1 * 5/2001 Busuioc et al. ............. 370/270
6,404,735 B1 * 6/2002 Beshai et al. .............. 370/230
6,457,061 B1 * 9/2002 Bal et al. ................... 709/245
6,477,150 B1 * 11/2002 Maggenti et al. .......... 370/312
6,585,778 B1 * 7/2003 Hind et al. ................. 715/513

OTHER PUBLICATIONS

Marshall et al.; "Emergent Quality of Service—A Bacterium Inspired Approach" Proc IEEE Openarch 2000 (Tel Aviv); 5 Pages.
Roadknight et al.; "Future Network Management—A Bacterium Inspired Solution" Proc EIS 2000 (Paisley); 4 Pages.

* cited by examiner

*Primary Examiner*—Dang Ton
*Assistant Examiner*—Inder Pal Mehra
(74) *Attorney, Agent, or Firm*—Nixon & Vanderhye P.C.

(57) ABSTRACT

An emergent network that is autonomous at the service level. Network nodes have policies that enable them to process different types of service requests, with the processing earning the nodes 'rewards'. Successful nodes can pass some or all of their policies to other nodes using the evolutionary biology of bacteria as a model.

28 Claims, 6 Drawing Sheets

Figure 2b

COMMUNICATIONS NETWORK

BACKGROUND OF THE INVENTION

1. Field of the Invention

This invention relates to the field of network management and in particular the management of complex data communication networks.

2. Related Art

Communication networks such as the Internet are probably the most complex machines built by mankind. The number of possible failure states in a major network is so large that even counting them is infeasible. Deciding the state that the network is in at any time with great accuracy is therefore not possible. In addition, data networks such as the Internet are subjected to a mixture of deterministic and stochastic load (see V Paxson and S Floyd, "*Wide Area Traffic: The Failure of Poisson Modelling*", IEEE/ACM Transactions on Networking 3, (3), pp 226–244, 1995 & S Gribble and E Brewer, "*System Design Issues for Internet Middleware Services: Deductions from a Large Client Trace*", Proceedings of the USENIX Symposium on Internet Technologies and Systems (USITS '97), December 1997). The network's response to this type of traffic is chaotic (see M Abrams et al, "*Caching Proxies: Limitations and Potentials*", Proc. 4th Inter. World-Wide Web Conference, Boston, Mass., December 1995), and thus the variation of network state is highly divergent and accurate predictions of network performance require knowledge of the current network state that is more accurate than can be obtained. Future networks, which will have increased intelligence, will be even more complex and have less tractable management. A network management paradigm is required that can maintain network performance in the face of fractal demands without detailed knowledge of the state of the network, and can meet unanticipated future demands.

Biologically inspired algorithms (for example genetic algorithms and neural networks) have been successfully used in many cases where good solutions are required for difficult (here, the term 'difficult' is used to represent a problem that is computationally infeasible using brute force methods) problems of this type (see CM Roadknight et al, "*Modelling of complex environmental data*", IEEE Transactions on Neural Networks. Vol. 8, No 4. P. 852–862, 1997 & D Goldberg, "*Genetic Algorithms in Search, Optimization and Machine Learning*", Addison-Wesley, 1989). They simulate evolutionary procedures or neural activation pathways in software, these then acting as problem solving tools. They can do this because they take a clean sheet approach to problem solving, they can learn from successes and failures and due to multiple adaptive feedback loops, they are able to find optima in a fractal search space quickly.

BRIEF SUMMARY OF THE INVENTION

According to a first aspect of the present invention there is provided a multi-service communications network comprising more than one node, each node comprising one or more nodal policies, said nodal policies determining which service requests are processed by each respective node. Each nodal policy may comprise;

(i) a service request identifier, said service request identifier determining the type of service request that may be processed by each respective node; and (ii) one or more service request criteria, said service request criteria determining whether a suitable type of service request will be processed by each respective node.

Preferably, one or more nodal policies from one or more of the plurality of nodes may be transmitted to another node, for example a node may export one or more of said respective nodal policies or a node may replicate all of its nodal policies to generate a clone of said node. Preferably, a node may import a further nodal policy, for example a node may delete an enabled nodal policy and enable a dormant nodal policy or if said node has no dormant nodal policies then said node may deactivate itself.

According to a second aspect of the invention there is provided a method of operating a multi-service communications network comprising more than one node, each node comprising one or more nodal policies, wherein said nodal policies determine which service requests are processed by each respective node.

Preferably one of said nodes exports one or more of said respective nodal policies or additionally one of said nodes replicates all of its nodal policies to generate a clone of said node. A node may import a further nodal policy or a node may delete an enabled nodal policy and enable a dormant nodal policy. If the node has no dormant nodal policies then said node may deactivate itself.

According to a third aspect of the invention there is provided a method of operating a node in a multi-service communications network, said network comprising more than one node, each node comprising one or more nodal policies, wherein said nodal policies determine which service requests are processed by each respective node.

The method may comprise the step of said node transmitting one or more of said respective nodal policies to a further node, or, in particular, the step of said node replicating all of said respective nodal policies to generate a further node, said further node being a clone of said node.

The method may comprise the step of said node importing a further nodal policy, or, in particular, the step of said node deleting an enabled nodal policy and enabling one or more dormant nodal policies. The method may comprise the additional step of said node deactivating itself if it has no dormant nodal policies.

According to a fourth aspect of the invention there is provided a method of upgrading a node within a multi-service communications network, said network comprising more than one node, each node comprising one or more nodal policies, said nodal policies determining which service requests are processed by each respective node, the method comprising the step of inserting an additional policy into said node, said policy having being exported by a further node.

According to a fifth aspect of the invention there is provided a method of upgrading a multi-service communications network, said multi-service communications network comprising more than one node, each node comprising one or more nodal policies, said nodal policies determining which service requests are processed by each respective node, the method comprising the step of inserting one or more nodal policies into said multi-service communications network, such that one or more of said nodes import at least one of said policies. Preferably, at least one of said nodal policies inserted into said multi-service communications network comprise a service request identifier such that nodes that import one of said policies can process a new service type.

According to a sixth aspect of the invention there is provided a method of initialising a multi-service communications network, said multi-service communications network comprising more than one node, each node comprising one or more nodal policies, said nodal policies determining which service requests are processed by each respective node, the method comprising the steps of inserting one or more of said nodal policies into said multi-service communications to enable said nodes to process service requests.

BRIEF DESCRIPTION OF THE DRAWINGS

The invention will now be described, by way of example only, with reference to the following figures in which;

FIGS. 2a–2c show a schematic depiction of the response of a multi-service communications network according to the present invention to different levels of network traffic.

DETAILED DESCRIPTION OF EXEMPLARY EMBODIMENTS

Figure 1:
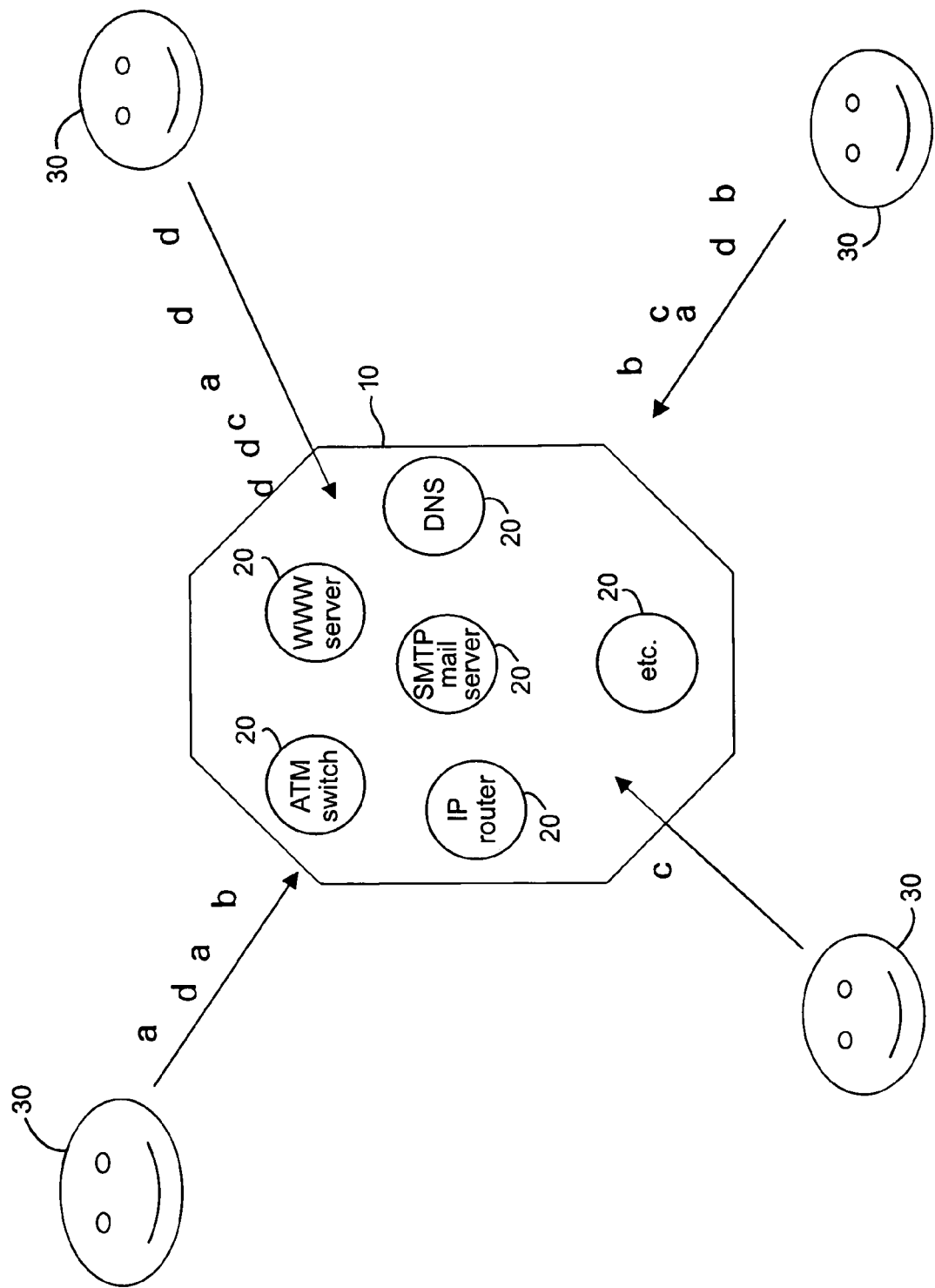
FIG. 1 shows a schematic depiction of a multi-service communications network according to the present invention.

FIG. 1 shows a multi-service communications network 10 that comprises a number of inter-connected nodes 20. These nodes are capable of performing one or more of a number of processes which are needed to support the multi-service network 10, for example an ATM switch, WWW server, IP router, SMTP mail server, domain name server (DNS), etc. The users of the multi-service network 10 are divided into a number of communities 30. These communities are geographically dispersed and have different requirements from the multi-service network, in terms of the type of request and the number of requests made (in FIG. 1, the different types of requests are indicated by the letters a, b, c & d, with each letter representing a request for a different service and the frequency of each letter representing the number of requests made for that service). Over time the number of communities 30 using the network 10 will vary and the nature and volume of network usage of each community will vary in a self-similar, deterministic way (see I Marshall et al, "*Performance implications of WWW traffic statistics*", submitted to http://www.wtc2000.org). Also, the number of services provided by the network will also vary over time as new services are introduced and some services become obsolete and are removed from the network.

One approach to managing such a network would be to make all nodes capable of processing all types of requests and with each node having sufficient capacity to be able to process all of the requests received at that node. However, this would lead to a very inefficient use of resources as virtually every node would be over-dimensioned and have an excess of capacity, both in terms of the type of service requests and the number of service requests that each node would be able to process.

Another approach would be to limit each node to processing a fixed subset of the different services supported by the network and providing a fixed capacity of processing capability for each service type at each node. By placing nodes which can process different types of traffic optimally within the network with respect to the type and number of service requests generated by the nearby communities it will be possible to meet most service requests. There will need to be some management layer within the network so that service requests can be "balanced" across the network, by sending service requests which can not be handled by local nodes to more distant nodes, as the service requests vary across the network. The disadvantage of this approach is that as communities change and the service requirements of the communities change, the location and/or the processing capabilities of the nodes will become less optimal, causing an increase in inter-nodal traffic as service requests are routed to an appropriate node, increasing the management overhead of the network. For a network having N inter-connected nodes there are $N^2$ inter-nodal relationships to manage, which makes such a management scheme intractable as N becomes large (for example, much larger than 1000).

According to the present invention the nodes shown in FIG. 1 are mostly autonomous and their behaviour is driven by a set of policies that finds an analogy in the genetic structure of bacteria. This analogy is consistent with the metabolic diversity and the evolutionary responses of bacteria. The Darwinian mechanism of evolution involves a simple 'survival of the fittest' algorithm (C Darwin, "*The Origin of the Species by Means of Natural Selection*", New American Library, New York). While a Darwinian model is undoubtedly applicable to slowly changing species within a slowly changing environment, the lack of an intra-generational exchange of information mechanism causes problems when applied to environments experiencing very rapid changes.

Bacteria are a set of metabolically diverse, simple, single-cell organisms. Their internal structure is simpler than most living cells, with no membrane-bound nucleus or organelles, and short circular DNA. It has been said that bacterial evolution 'transcends Darwinism' (D Caldwell et al, "*Do Bacterial Communities Transcend Darwinism?*", Advances in Microbial Ecology. Vol. 15. p. 105–191, 1997), with asexual reproduction ensuring survival of the fittest and a more Lamarkian (Lamark was an 18th century French scientist who argued that evolution occurs because organisms can inherit traits, which have been acquired by their ancestors during their lifetime) mechanism of evolution occurring in parallel, with individuals capable of exchanging elements of their genetic material, known as plasmids, during their lifetime. This plasmid migration allows much quicker reaction to sudden changes in influential environmental factors. These processes are commonly referred to as adaptation. When a population of *E. Coli* is introduced to a new environment adaptation begins immediately, with significant results apparent in a few weeks (see RE Lenski and M Travisano "*Dynamics of Adaptation and Diversification*", Proc. Nat Acad. Sci. 91: 6808–6814, 1994).

The set of policies specifies which type of service request the node is able to process (e.g. a, b, c or d from FIG. 1), and a rule, or rules, that determine whether the node will accept a service request or not. Each node has a certain number of policies and these policies determine how the node responds to the changing environment of the network (in the same way as the genetic material of a bacterium determines how that bacterium responds to its environment). The policies take the form {x,y,z} where:

x is a function representing the type of service requested;
y is a function which determines whether a service request is accepted dependent upon the number of service requests queued at the node; and
z is a function which determines whether a service request is accepted dependent upon the activity level of the node.

The 'value' that a node may derive from processing a service request would be receiving revenue from a user or network or service provider (this is analogous to a bacterium gaining energy from metabolising resources, such that the bacterium can survive and potentially reproduce). The quantum of revenue will depend upon the type of service request which is processed by the node, with some service requests being more important and hence providing greater reward when they are processed.

Each node may have any number of policies. Enabled nodes (i.e. a node that is processing service requests) will have one or more enabled policies (i.e. policies which are in use to determine the response of the node) and may also have a number of dormant policies (i.e. once enabled policies that are no longer used to determine the response of the node). Dormant policies may be re-enabled and enabled policies may be repressed, becoming dormant.

User requests for service are received by the node(s) nearest the point of entry to the network from the user community generating the service request. If the node is capable of processing the request then the request joins a queue, with each node evaluating the items that arrive in its input queue on a 'first in, first out' principle. If the service request at the front of the queue matches an available policy the service request is processed, the node is 'rewarded' (i.e. revenue is generated for the network or service operator) and the request is then deleted from the queue. If the service request does not match any of the node's enabled policies then the request is forwarded to an adjacent node and no reward is given. The more time a node spends processing service requests, the busier it is and the rewards (or revenue) generated by the node increases. Conversely, if a node does not receive many service requests for which it has an enabled policy then the node is not busy and little reward (or revenue) is being generated by that node. If a node which is receiving service requests, for which it has an enabled policy, at a greater rate than it is capable of processing those requests then the length of the queue of service requests will grow. This will lead to an increase in the time taken to process a service request and hence a poor service will be supplied to the user communities.

In order to reduce these unwanted effects it would be desirable for the nodes which are not busy and/or which have small queue lengths to able to acquire the traits of the nodes which are busy and/or have large queue lengths. One method by which this may be achieved is by adopting a scheme that is an analogue of plasmid migration in bacteria. Plasmid migration involves genes from healthy individuals being shed or replicated into the environment and subsequently being absorbed into the genetic material of less healthy individuals. If plasmid migration does not help weak strains increase their fitness they eventually die. Thus, if a node has a queue length or an activity indicator that reaches an upper threshold value then one of the node's policies is randomly copied into a 'policy pool' which is accessible to all nodes. Alternatively, the node may copy the most successful policy (in terms of generating revenue over a given recent period) or any other policy into the 'policy pool'. If a node has an activity indicator and/or a queue length that reaches a lower threshold then a policy is randomly selected from the policy pool and acquired by the node. If the policy pool is empty then the node must wait for a 'successful' node to add a policy to the policy pool. The threshold values (both upper and lower) need not be the same for the queue length as for the activity indicator.

If a node maintains the upper threshold value for the queue length or for the activity indicator for a given period of time (i.e. the node sustains its success) then the node can clone itself by producing another node having the same set of policies as the parent node. This is analogous to healthy bacterium with a plentiful food supply reproducing by binary fission to produce identical offspring. Alternatively, this cloning process may be initiated by the node's queue length or activity indicator reaching a second upper threshold value, this second upper threshold value being greater than the first upper threshold value. Conversely, if a node maintains the lower threshold value for the queue length or for the activity indicator for a given period of time (i.e. the idleness of the node is sustained) then some or all of the enabled policies of the node are deleted and any dormant policies are activated. If the node has no dormant polices then once all the enabled policies have been deleted then the node is switched off. This is analogous to bacterial death due to nutrient deprivation.

Following the analogy with bacterial evolution, it is believed that a slower rate of adaptation to the environmental changes is preferable to a faster rate of adaptation, as a faster rate may mean that the network nodes end up in an evolutionary 'blind alley', without the genetic diversity to cope with subsequent environmental changes. This can be achieved by favouring random changes in nodal policies rather than favouring the adoption of successful policies or the rejection of unsuccessful policies.

The other method by which the nodal policies may be varied is analogous to random genetic mutations which occur in bacterium. For example, policy mutation may involve the random alteration of a single value in a policy. If a policy were to have the form:

Accept request for service a if activity indicator <80% then permissible mutations could include (mutation indicated in bold);

Accept request for service c if activity indicator <80%, or
Accept request for service a if activity indicator <60%, or
Accept request for service a if queue length <80%.

Simulation has shown that single value mutations give rise to stable systems with fairly low rates of mutation. Whilst it would be possible to have multiple value mutations (e.g. 'Accept request for service a if activity indicator <80%' mutating to 'Accept request for service b if queue length <20%') this may lead to an unstable system). Results of simulations show that because of the long-term self-stabilising, adaptive nature of bacterial communities, which is mimicked by the nodal policies, a network management algorithm based upon bacterial genetic structure and environmental responses provides a suitable approach to creating a stable network of autonomous nodes. The above approach makes each node within the network responsible for its own behaviour, such that the network is modelled as a community of cellular automata. Each member of this community is selfishly optimising its own local state, but this 'selfishness' has been proven as a stable community model for collections of living organisms (R Dawkins, "*The Selfish Gene*", Oxford University Press, 1976) and partitioning a system into selfishly adapting sub-systems has been shown to be a viable approach for the solving of complex and non-linear problems (S Kauffman et al "*Divide and Coordinate: Coevolutionary Problem Solving*", ftp://ftp.santafe.edu/pub/wgm/patch.ps). Thus overall network stability is provided by a set of cells that are acting for their own good and not the overall good of the network and this node self-management removes most of the high-level network management problems.

The inventors have implemented a simulation of a network according to the present invention (and of the kind described above). The simulation system supports up to ten different service types but in the interest of simplicity the following discussion will refer to a subset of four of these service types; A, B, C, D and is based upon a rectangular grid having 400 vertices (which is merely an exemplary value and not critical to the working of the invention). The system is initialised by populating a random selection of vertices with enabled nodes. These initial nodes have a random selection of policies which define how each node will handle requests for service. These policies have a number of variables and are represented by the form {x,y,z} where:

x is a function representing the type of service requested;

y is a function between 0 and 200 which is interpreted as the value in a statement of the form Accept request for service [Val(x)] if queue length <Val (y); and z is an integer between 0 and 100 that is interpreted as the value in a statement of the form Accept request for service [Val(x)] if busyness <Val(z%)

A node having a number of policies is represented as $\{x_1, y_1, z_1: x_2, y_2, z_2: \ldots : x_i, y_i, z_i\}$ Requests are input to the system by injecting sequences of characters, which represent service requests, at each vertex in the array. If the vertex is populated by a node, the items join a node input queue. If there is no node at the vertex then the requests are forwarded to a neighbouring vertex. Each node evaluates the service requests that arrive in its input queue on a 'first in, first out' principle. If the request at the front of the queue matches an available rule then the request is processed, the node is rewarded for performing the request and the request is deleted from the input queue of the node. If there is no match between the service request and the node's policies then the request is forwarded to another vertex and no reward is obtained by the node. Each node may only process four requests per measurement period (henceforth referred to as an epoch). The more time a node spends processing requests, the busier it is seen to be and the greater the value of its activity indicator. The activity indicator can be determined by calculating the activity in the current epoch, for example, if the node processed three requests in the current epoch, generating 25 'points' of reward for each processed request, then the activity indicator would be 75. However in order to dampen any sudden changes in behaviour due to a highly dynamic environment it is preferred to combine the activity indicator at the previous epoch with the activity indicator for the current epoch. It has been found for the simulated network that a suitable ratio for the previous indicator to the current indicator is 0.8:0.2. For example, if in this epoch the node has processed three requests with each generating 25 points, and the node had an activity indicator of 65 for the previous epoch then the activity indicator for the present epoch will be 67. It will be seen that the ratio between the two indicators will vary with each system and depend upon how dynamic the system is. It should be also noted that the selection of four processing steps per epoch is an arbitrary choice and that other values may be adopted for this parameter. Plasmid interchange, as described above, was modelled in the simulation and if, through the interchange of policies, a node has more than four enabled policies then the newest policy to be acquired is repressed (i.e. registered as now being dormant) so that no more than four policies are enabled at any time in a node (although this limit of four enabled policies is an arbitrary one and may be varied). If a node has 4 enabled polices and acquires one from the policy pool then the policy acquired from the pool will not be repressed, but one of the policies previously present will be repressed. Other selection criteria may be applied when repressing policies, e.g. repressing the least successful policy or the policy which has been enabled for longest, etc.

Currently, values for queue length and the time-averaged activity indicator are used as the basis for interchange actions, and evaluation is performed every five epochs. If the queue length or activity indicator is above a threshold (both of which were 50 in this example [Clearly this value is only an example, other values may be selected and there is no need to have the threshold value for the queue length to be equal to that of the activity indicator. The threshold values will determine the number of nodes which can reproduce to occupy the system and should be chosen suitably to match the performance requirements of the system]), then one of the node's policies is copied into a 'policy pool' accessible to all nodes. If the node continues to exceed the threshold for four evaluation periods (i.e. 20 epochs), it replicates its entire genome into an adjacent vertex where a node is not present, simulating reproduction by binary fission which is performed by healthy bacteria with a plentiful food supply. Offspring produced in this way are exact clones of their parent.

If the activity indicator is below a different threshold, for example 10, then the node is classified as idle and a policy is randomly selected from the policy pool and inserted into the node. If a node is 'idle' for three evaluation periods (i.e. 15 epochs), its enabled policies are deleted. If any dormant policies exist these are enabled, but if there are no dormant policies then the node is switched off. This is analogous to bacterial death by nutrient deprivation. For example, if a node having the policy {a, 40,50:c, 10,5} has an activity indicator of greater than 50 when it is evaluated, it will put a random policy (e.g. {c, 10,5}) into the policy pool. If a node with the genome {b, 2,30:d, 30,25} is later deemed to be idle it may import that policy and become {b, 2,30:d, 30,25:c, 10,5}. If the imported policy does not increase the activity indicator of the node such that the node is no longer idle then a further policy may be imported; if there is no further policy to be imported then the node may be deleted.

Figure 2A:
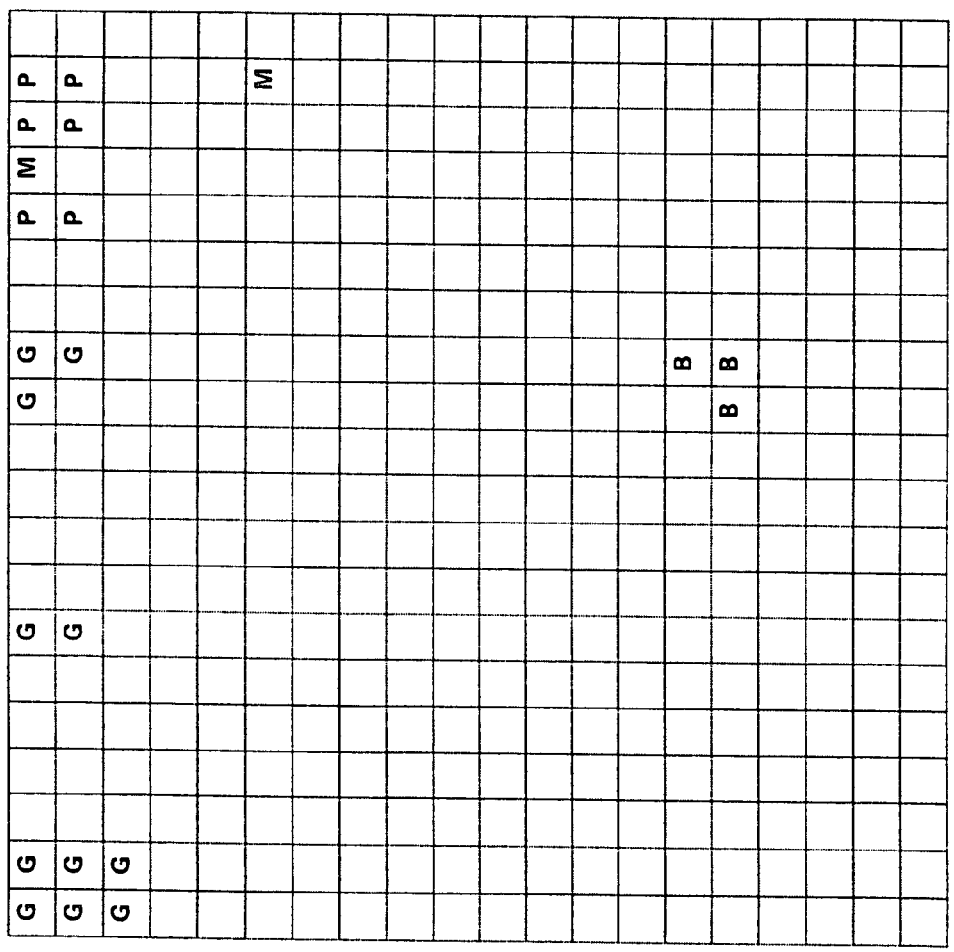
Figure 2B:
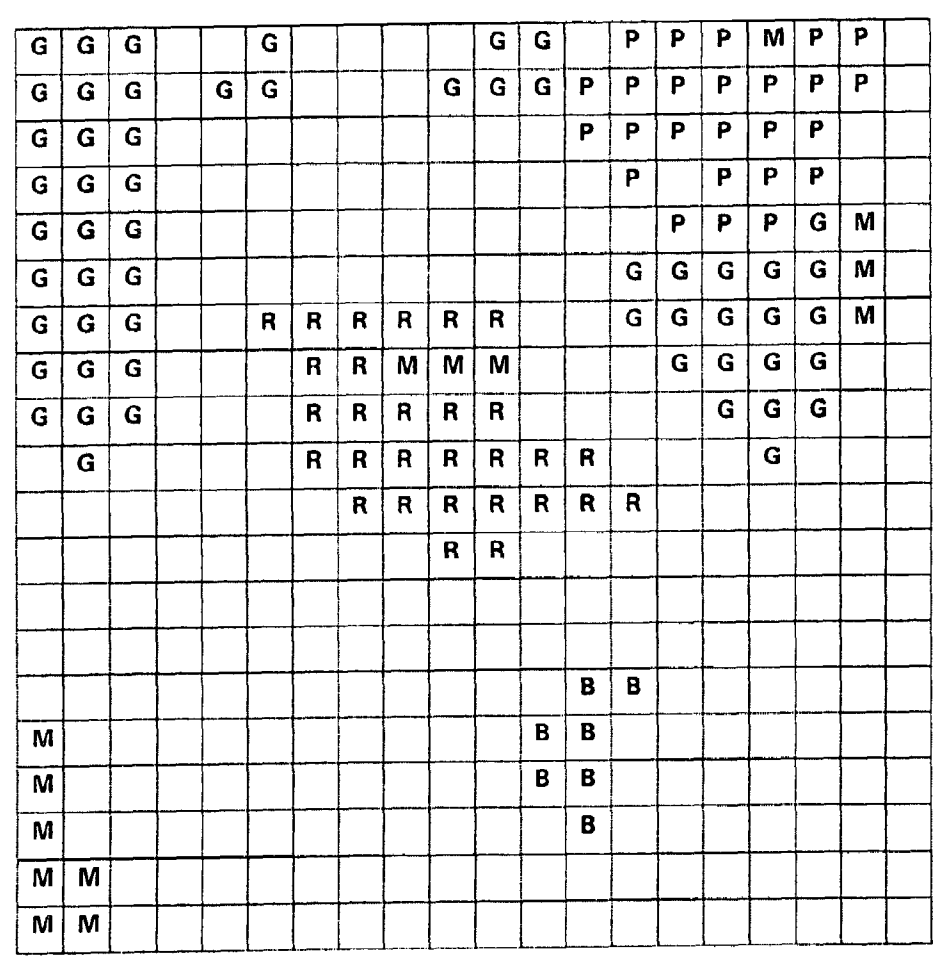
Figure 2C:
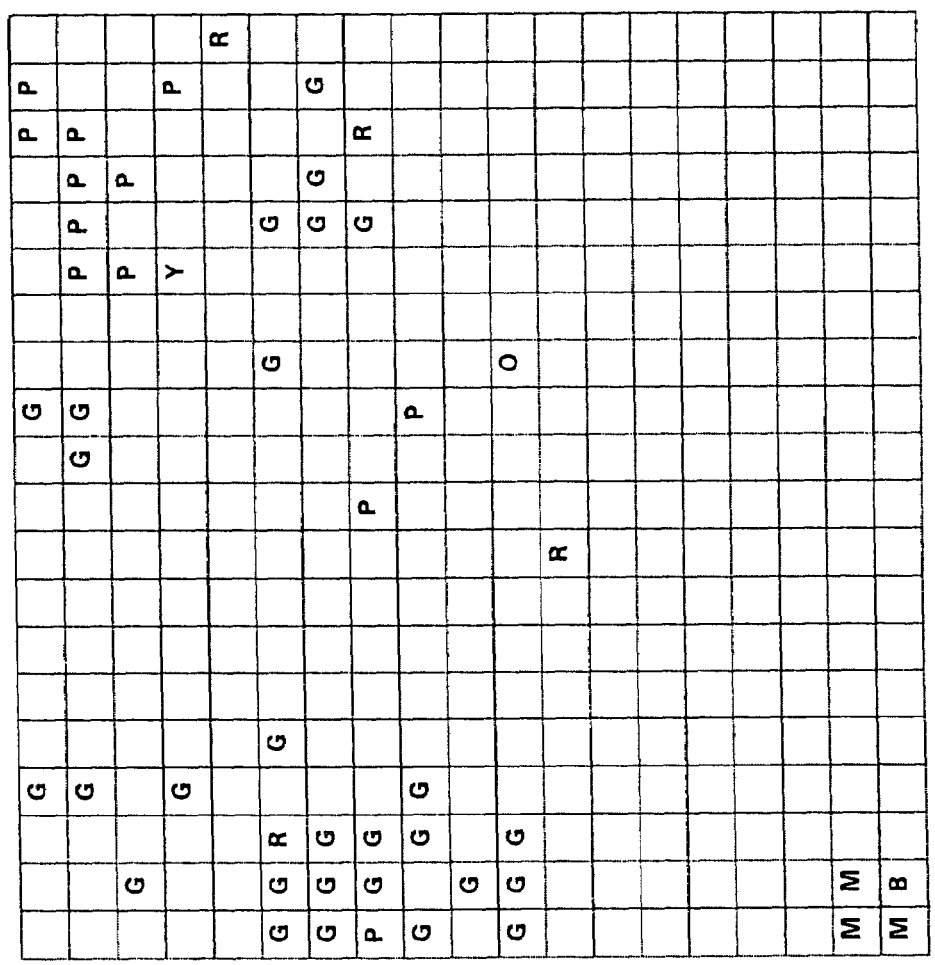

A visualisation environment was created for this implemented simulation. The visualisation environment provides an interface where network load and other parameters can be varied in many ways, thereby allowing stresses to be introduced into the system in a flexible manner. For instance, the ratio of requests for the four services can be made to vary over time, as can the overall number of requests per unit time. A 'petri dish' that can accommodate up to 400 nodes was used to display the system state. Rules governing reproduction and evolution, including plasmid migration (as described above), were introduced into the simulation, in an attempt to force the nodes to model the behaviour of bacterium in a changing environment. FIGS. 2a–2c show what happens when an initial low load is increased and then reduced. Each strain of node that can process a single type of request is represented in the FIG. 2a by a code representing the colour used to display the strain by the simulator, e.g. R [red], G [grey], B [blue], etc. When the load increases (FIG. 2b), the existing colonies increase in size and colonies of new strains of node appear due to mutation and plasmid migration. More complex strains with the ability to handle more than one service request type were depicted by a combination of these colours e.g. a node which could process the strains indicated by red and blue is indicated by P [purple] (see FIGS. 2a & 2b). FIG. 2c shows the response to a decrease in load. As in real bacterial communities a decrease in food causes a large amount of cell death, but also an increase in diversity (which is shown by the increase in the number of different node strains) as more plasmid migration and mutation occurs.

It will be immediately obvious that the control parameters given above are merely exemplary and are provided to illustrate the present invention. The optimal values of the different parameters will vary from system to system depending upon their size, dynamic constants, growth rates, etc.

The system described above has very significant advantages when it comes to adding new services to a multi-service network. Conventionally it is necessary to take the network down and add the required hardware, update software etc., so that the network is capable of carrying the new service(s). Using a network according to the present invention it is possible to provide new service by adding new functionality to existing nodes so that they can deal with the various service requests associated with the new service.

The simplest method of achieving this is to allow nodal policies to mutate so that a policy can process the new type of service request(s). If a policy mutates such that it can process a new service request type then the node will have an abundant food source, which will aid the distribution of the newly mutated policy through the nodal population, by plasmid migration and/or by reproduction. If the mutation leads to a the node being able to process a service type which has not yet been introduced into the network then the node may well die out, leading to the suppression of the less useful mutation. It may be preferable to have some form of restriction on the extent of mutation allowable to try and minimise such an occurrence. Clearly, the mutation range for the policies must allow all of the service request types in use to be selected for.

Another method of enabling nodes to process new types of service request is to modify the policy set of an existing node so that it can handle the new service type. In order to do this it will be necessary to disable the node for a short period of time, but the distributed nature of the network means that other nodes will react to accommodate the missing node. It is possible to introduce the policy into the policy set either as an enabled policy or a dormant policy, although an enabled policy is more likely to be spread quickly through the network. Further methods of enabling the network to cope with new service types include the insertion of one or more new nodes which have a number of policies, some of which enable the new type of service request to be processed or the insertion of suitable policies into the policy pool, from where unsuccessful nodes may acquire these policies.

Figure 3A:
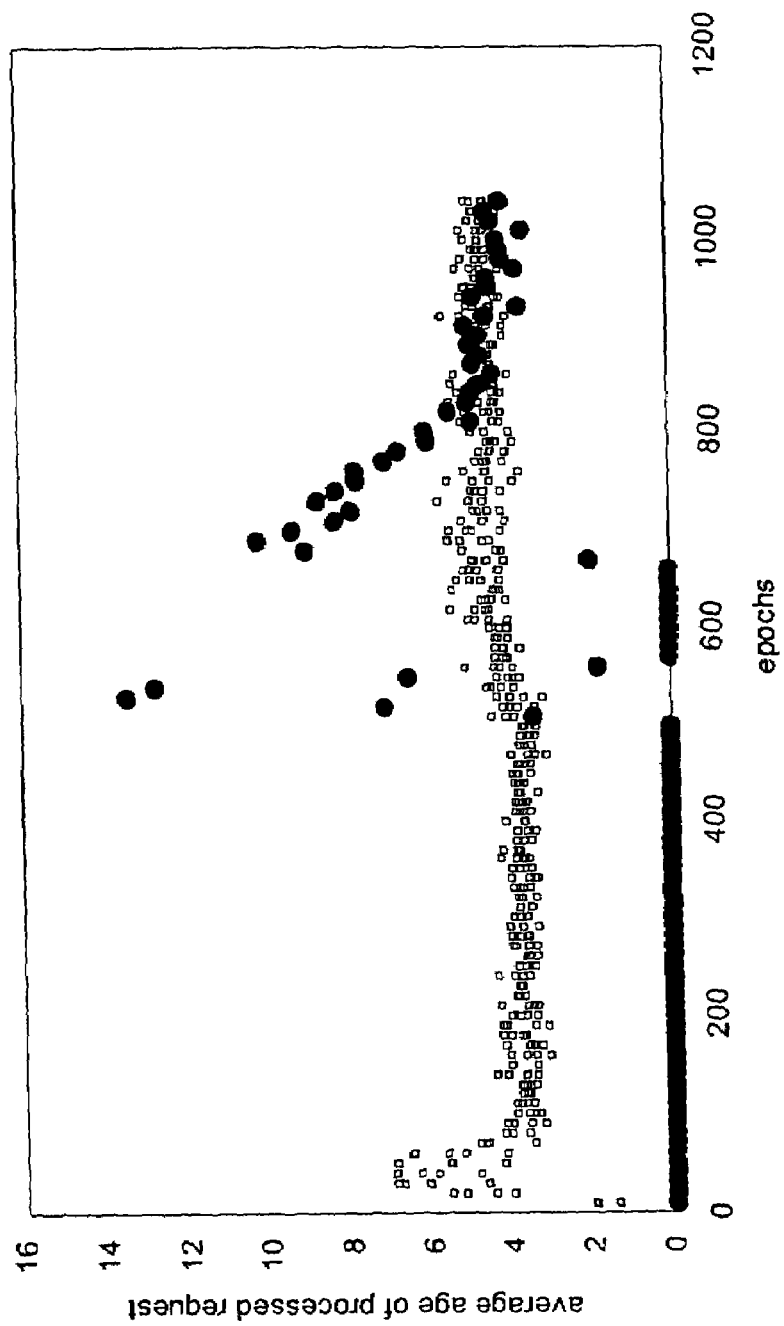
FIGS. 3a–3b show a graphical depiction of the response of a multi-service communications network according to the present invention to the introduction of new service types to the network.
Figure 3B:
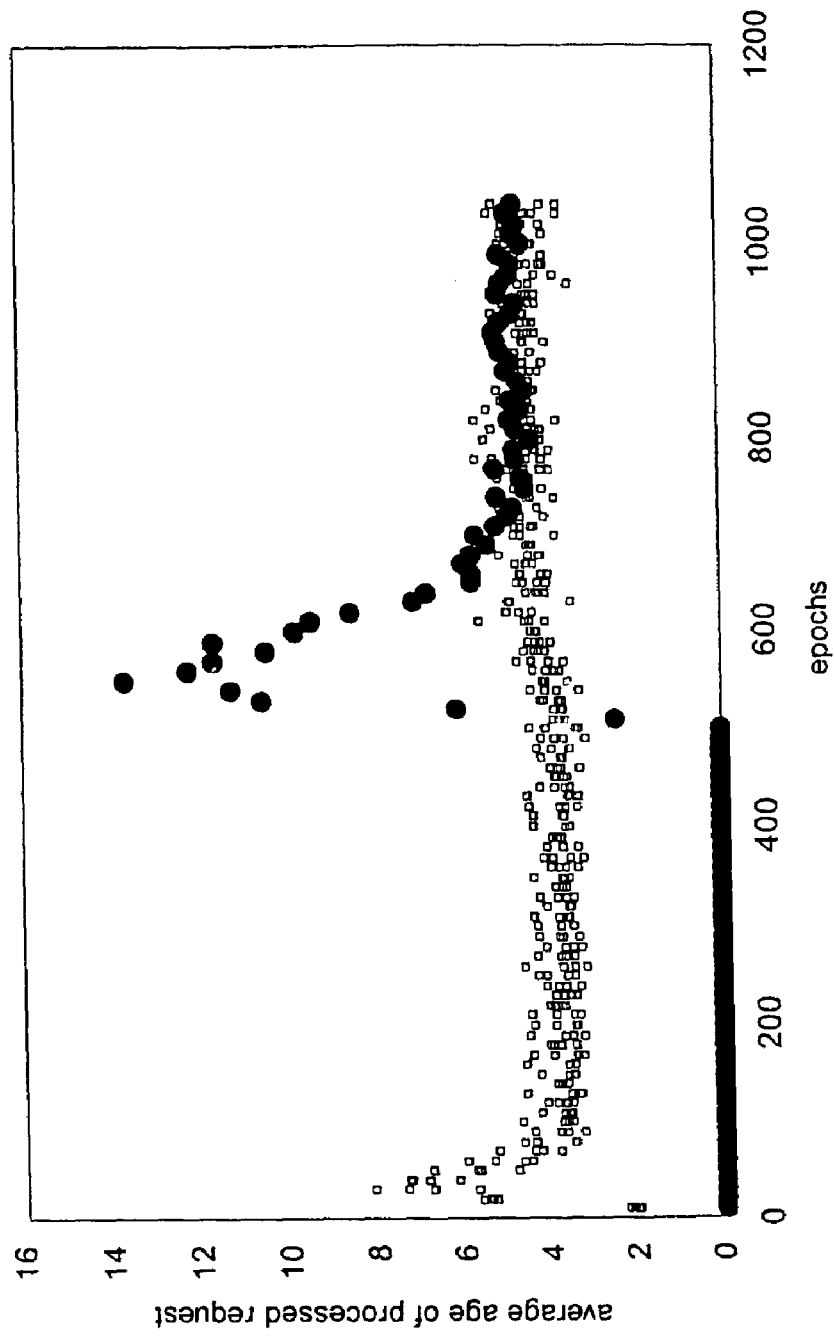

FIG. 3a shows the response of the simulation to the insertion of a new type of service requests at the same time that the nodal policies are allowed to mutate to process the new service type (the vertical line on the graph at approximately 500 epochs indicates the insertion of the new type of requests). The new type of service request is indicated by solid circles in FIG. 3a, with the other types of service request being represented by open squares. The average time to process the new type of service request rises sharply, as at first only a few nodes possess suitable nodal policies, but the average processing time falls as these policies are spread by migration and reproduction. The graph then drops to zero, which represents the policy being made dormant due to a lack of service requests being made. The average processing time for the new type of service request then rises again as the policy is re-enabled, and the average processing time soon reaches a steady state which is comparable to that of the other types of service request. FIG. 3b shows a similar graph which depicts the response of the simulation to the simultaneous introduction of a new type of service request and the injection of a suitable nodal policy into the policy pool. As before, the average processing time for the new type of service request rises steeply as service requests are made, but falls to a steady state value as the nodal policies for the new type of service request are spread through the network.

Due to the evolutionary nature of the network if a given service type is not used extensively then the number of nodes having suitable policies for that service type will decrease as the nodes die out or adapt to process other service types. If removal of an in use service type from the network is required, then the methods outlined above can be applied in reverse so that the nodal policies can not mutate such that the service type can be processed, applicable policies can be deleted from nodes or from the policy pool, etc.

An example of such a multi-service network is disclosed in U.S. patent application Ser. No. 09/088,727. The network would contain a number of large scale active network nodes (ANNs), with each ANN comprising a large processor cluster, for example up to 200 processors, with each processor running a dynamic proxylet server (DPS) and around 10 Java virtual machines (JVMs), each of which contain one or more proxylets (a proxylet is a small program that implements an active network service, such as transcoding a data resource from one format to another e.g. from a QuickTime video stream to a RealPlayer video stream, or from CD format audio to MP3 format audio).

Each DPS controls and implements the algorithmic rules discussed above that determine the activity indicator levels at which nodes may reproduce, export nodal policies, import nodal policies, etc. The JVMs are the nodes (i.e. analogous to bacterium) with the proxylets (or policies pointing to the proxylets and authorising execution) providing the nodal policies (i.e. the genes of the bacteria).

In use, the proxylets are mostly multi-user devices, but they may be installed and used by a single user. A proxylet may be installed by a user who then proceeds to load the proxylet by making suitable service demands (this is analogous to placing a nodal policy into a node and then injecting some requests for the service it represents). Only at very low traffic loads will a given proxylet not be present at all the ANNs, but this gives rise to efficient network resource utilisation as proxylets are run only in response to user demand and are run at a convenient network location.

The nodes of the simulated network do not have any awareness of the concept of an ANN or the boundaries between the different ANNs that comprise a network. The main reasons for this is to minimise the complexity of the nodal operations and because of the fuzzy nature of the boundaries in a cluster model.

The simulation indicates that such an active network should be capable of implementation and that reasonable levels of performance achieved. The ability to manage the deployment of new services over such networks has also been successfully simulated.

We claim:

1. A multi-service communications network comprising:
   a plurality of autonomously behaving nodes, each node being responsible for its own behavior,
   each node comprising at least one nodal policy which determines which service requests are processed by each respective node,
   wherein each of said plurality of autonomously behaving nodes being responsible for its own behavior performs:

acquiring one or more nodal policies to enable the node to process a request for a new service;

providing data enabling at least one other node in said communications network to behave autonomously to implement a nodal policy enabling each said at least one other node to process a request for the new service; and optimizing its own local state using said at least one nodal policy; and wherein each autonomously behaving node is responsible for its own behavior when acquiring a nodal policy by retrieving information from a policy pool which mutates a policy currently implemented by the node, the mutated policy enabling the node to process the request for the new service.

2. The multi-service communications network as in claim 1 wherein the information in the policy pool is accessible to all nodes in the multi-service communications network.

3. The multi-service communications network as in claim 1 wherein each nodal policy comprises:
(i) a service request identifier, said service request identifier determining a type of service request that may be processed by each respective node; and
(ii) at least one service request criteria, said service request criteria determining whether a suitable type of service request will be processed by each respective node.

4. The multi-service communications network as in claim 1 wherein at least one nodal policy from at least one of the plurality of autonomously behaving nodes may be transmitted to another node.

5. The multi-service communications network as in claim 1 wherein a node may replicate all of its nodal policies to generate a clone of said node.

6. The multi-service communications network as in claim 1 wherein the node may delete an enabled nodal policy and enable a dormant nodal policy.

7. The multi-service communications network as in claim 6 wherein if the node has no dormant nodal policies then said node may deactivate itself.

8. The multi-service communications network as in claim 1 wherein a variable within a nodal policy is randomly varied.

9. A method of operating a multi-service communications network, the network comprising a plurality of autonomously behaving nodes, each of the nodes being responsible for its own behavior and comprising one or more nodal policies which determine which service requests are processed by each respective node, the method comprising:
enabling each of said plurality of autonomously behaving nodes which is itself responsible for behavior to perform:
acquiring the one or more nodal policies to enable the node to process a request for a new service;
providing data enabling at least one other node in said communications network to behave autonomously to implement a nodal policy enabling each said at least one other node to process a request for the new service; and
optimizing its own local state using said one or more nodal policies;
wherein each of the nodes is responsible for its own behavior when acquiring the nodal policy by retrieving information from a policy pool which mutates a policy currently implemented by the node, the mutated policy enabling the node to process the request for the new service.

10. The method as in claim 9 wherein the information in the policy pool is accessible to each of the nodes in the multi-service communications network.

11. The method as in claim 9, wherein one of said nodes is itself responsible for the behavior of exporting at least one of said nodal policies.

12. The method as in claim 9 wherein one of said nodes is itself responsible for the behavior of replicating all of the nodal policies to generate a clone of said node.

13. The method as in claim 9, wherein the node is itself responsible for the behavior of deleting the nodal policy of the at least one other node and enabling a dormant nodal policy.

14. The method as in claim 13 wherein if the node has no dormant nodal policies then said node is itself responsible for the behavior of deactivating itself.

15. The method of upgrading a node within a multi-service communications network, said network comprising more than one autonomously behaving node, each node being responsible for its own behavior and comprising at least one nodal policy determining which service requests are processed by each of the respective nodes, the method comprising the steps of:
inserting an additional policy into said node, said inserting step comprising behavior which said node is itself responsible for, said policy having been exported by a further node and said exporting of said policy by said further node comprises behavior which said further node is itself responsible for; and
optimizing a local state of said node using one or more nodal policies, said optimizing step comprising behavior which said node is itself responsible for,
wherein each inserted nodal policy comprises information retrieved from a policy pool which mutates a policy currently implemented by the node, the mutated policy enabling the node to process a request for a new service.

16. A method of upgrading a multi-service communications network, said multi-service communications network comprising more than one autonomously behaving node, each of the nodes being responsible for its own behavior and comprising one or more nodal policies, said nodal policies determining which service requests are processed by each respective node, the method comprising the steps of:
at least one node inserting one or more nodal policies into said multi-service communications network, said inserting step comprising behavior which each said at least one node is itself responsible for such that one or more of said nodes which is responsible for its own behavior imports at least one of said policies, and
the at least one node which is responsible for its own behavior optimizes its own local state using one or more nodal policies,
wherein each of the inserted nodal policies comprises information retrieved from a policy pool which mutates a policy currently implemented by the node, the mutated policy enabling the node to process a request for a new service.

17. The method as in claim 16, wherein at least one of said nodal policies inserted into said multi-service communications network comprises a service request identifier such that each of the nodes that imports one of said policies can process a new service type.

18. A method of initializing a multi-service communications network, said multi-service communications network comprising more than one autonomously behaving node, each of the nodes being responsible for its own behavior and comprising one or more nodal policies, said nodal policies determining which service requests are processed by each respective node, the method comprising the steps of:

at least one node inserting one or more of said nodal policies into said multi-service communications network, said inserting step comprising behavior which each said at least one node is itself responsible for and said inserting step enabling each said node to import one or more nodal policies to process a service request, each autonomously behaving node optimizing its own local state using said one or more nodal policies, said optimizing comprising behavior which each of said nodes is itself responsible for, wherein each of the inserted nodal policies comprises information retrieved from a policy pool which mutates a policy currently implemented by the node, the mutated policy enabling the node to process said service request.

19. A multi-service communications network comprising:
a plurality of autonomously behaving nodes,
each of the nodes being responsible for its own behavior and comprising at least one nodal policy which determines which service requests are processed by each respective node,
wherein each of said plurality of autonomously behaving nodes is responsible for its own behavior when acquiring the nodal policy to enable said autonomously behaving node to process the request for a new service and when providing data enabling at least one other node to implement a nodal policy which enables the other node to process a request for the new service,
wherein each of the nodes is responsible for its own behavior when optimizing its own local state using said at least one nodal policy, and
wherein each of the acquired nodal policies comprises information retrieved from a policy pool which mutates a policy currently implemented by the node, the mutated policy enabling the node to process said service requests.

20. The multi-service communications network as in claim 19 wherein each of the nodal policies comprises:
(i) at least one of the service requests identified, said service request identifier determining the type of service request that may be processed by each of the respective nodes; and
(ii) at least one service request criteria, said service request criteria determining whether the service request will be processed by each of the respective nodes.

21. A method of operating a multi-service communications network, the network comprising a plurality of autonomously behaving nodes, each of the nodes being responsible for its own behavior and comprising one or more nodal policies which determine which service requests are processed by each of the respective nodes, the method comprising the steps of:

each of the nodes acquiring the nodal policy to enable the node to process a request for a new service, said step of acquiring comprising behavior each of the nodes is autonomously responsible for;

providing data enabling at least one other node to implement a nodal policy enabling the other node to process a request for the new service, the data being provided by the node in the network which has already acquired the nodal policy, wherein said node providing the data is itself responsible for the behavior of providing the data, wherein the nodes are each individually configured to optimize their local state using said one or more nodal policies, and wherein each of the nodes acquires the nodal policy by itself being responsible for the behavior of retrieving information from a policy pool, said information mutating a policy currently implemented by the node, the mutated policy enabling the node to process the request for the new service.

22. The method as in claim 21 wherein the information in the policy pool is accessible to all nodes in the multi-service communications network.

23. The method as in claim 21 wherein at least one of said nodal policies comprises a service request identifier such that nodes that import one of said policies can process a new service type.

24. The method as in claim 21 wherein each node acquires a nodal policy by retrieving a new nodal policy from the policy pool.

25. A method of adding a new service to a multi-service communications network, said network comprising more than one autonomously behaving node, each of the autonomously behaving nodes being responsible for its own behavior and comprising one or more nodal policies determining which service requests are processed by each of the respective nodes, the method comprising the steps of:

each of the nodes being itself responsible for its behavior when acquiring a nodal policy to enable the node to process a request for the new service;

wherein each of the nodes acquiring the nodal policy is itself responsible for behavior which provides data enabling at least one other node in said communications network which has not acquired said nodal policy to be itself responsible for behavior which implements the nodal policy which enables said at least one other node to process a request for the new service;

wherein said provided data comprises information stored in a policy pool which is accessible to all nodes;

wherein each of the nodes in the network is itself responsible for its behavior comprising optimizing its own local state using said one or more nodal policies, wherein each of the nodes is itself responsible for behavior which acquires the nodal policy by retrieving information from the policy pool which mutates a policy currently implemented by the node, the mutated policy enabling the node to itself be responsible for behavior which processes the request for the new service.

26. The method as in claim 25 wherein at least one of said nodal policies comprises a service request identifier such that nodes that import one of said policies can process a new service type.

27. The method as in claim 25 wherein each of the nodes acquires the nodal policy by retrieving a new nodal policy from the policy pool.

28. An autonomously behaving node in a multi-service communications network,
the node being responsible for its own behavior and comprising one or more nodal policies which determine which service requests are processed by the node,
the node being responsible for its own behavior when acquiring a nodal policy to enable the node to process any received requests for a new service, and responsible for its own behavior when subsequently providing data enabling at least one other node in said communications network which has not already acquired said nodal policy, the data comprising information stored in a policy pool which is accessible to all nodes in the multi-service communications network, and
wherein each of the nodes is itself responsible for behavior which acquires the nodal policy by retrieving the information from the policy pool which mutates a policy currently implemented by the node, the mutated policy enabling the node to itself be responsible for behavior which processes the request for the new service, the node being further responsible for its own behavior when optimizing its own local state using said one or more nodal policies.

* * * * *